United States Patent [19]
Delaney et al.

[11] 4,028,597
[45] June 7, 1977

[54] MOTOR CONTROL SYSTEMS

[75] Inventors: Michael J. Delaney, Greene; Hiram G. Gilbert, Binghamton, both of N.Y.

[73] Assignee: The Raymond Corporation, Greene, N.Y.

[22] Filed: July 12, 1974

[21] Appl. No.: 487,890

[52] U.S. Cl. .................. 318/87; 318/52; 318/139; 318/88
[51] Int. Cl.² .......................................... H02P 3/00
[58] Field of Search .............. 318/139, 52, 87, 88

[56] References Cited
UNITED STATES PATENTS

| | | | |
|---|---|---|---|
| 1,327,795 | 1/1920 | Whittaker | 318/52 |
| 1,371,559 | 3/1921 | Hellmund | 318/52 |
| 3,134,063 | 5/1964 | Hastings, Jr. | 318/139 |
| 3,179,198 | 4/1965 | Hastings, Jr. | 318/139 X |
| 3,190,387 | 6/1965 | Dow | 318/139 X |
| 3,356,173 | 12/1967 | Holcombe | 318/139 X |
| 3,454,122 | 7/1969 | Grady, Jr. | 318/139 X |
| 3,534,239 | 10/1970 | Risberg | 318/52 |
| 3,596,154 | 7/1971 | Gurwicz | 318/52 |
| 3,749,192 | 7/1973 | Karchak, Jr. et al. | 318/139 X |
| 3,769,566 | 10/1973 | Mehta | 318/139 X |

Primary Examiner—B. Dobeck
Attorney, Agent, or Firm—Richard G. Stephens

[57] ABSTRACT

A battery-powered thyristor-controlled lift truck traction motor control system includes simple and economical means for providing plugging torque in a continuous or proportional manner. A dual-motor drive system disclosed allows series motors to be operated in parallel from a single thyristor control system during both acceleration and plugging conditions, and allows the two motors to be operated at widely different speeds without large currents circulating between them.

30 Claims, 8 Drawing Figures

MOTOR CONTROL SYSTEMS

Our invention relates to electric motor control circuits, and more particularly to an improved arrangement for controlling the speed of direct current traction motors such as those used on battery-powered lift trucks. It is highly desirable that a lift truck have great maneuverability and be capable of very sharp turns in narrow warehouse aisles. Various prior trucks having a pair of unpowered, non-steerable load wheels and one or more powered steerable rear wheels are capable of sharp turning but have limited traction, and also, provision of powered steerable wheels tends to be expensive. Such disadvantges may be overcome through use of a pair of powered non-steerable load wheels and an unpowered steerable rear wheel. The two load wheels of such a truck may be driven by a single motor through a mechanical differential gearing and an axle, or the two load wheels may be driven by individual electric motors. The expense of differential gearing, and the space occupied by differential gearing and an axle, make individual load wheel drive using two separate motors much preferable in various applications.

While the use of thyristor speed control of lift truck traction motors has well-established advantages, the prior art has not been able to apply such speed control to a pair of separate motors in a wholly satisfactory manner. The relative loads seen by the two motors and the relative speeds of the two motors vary widely as a function of the steering angle, between a zero steering angle condition during which the two motors have equal load and equal speeds, and desirably, a maximum steering angle condition during which one motor must be driven in a direction opposite to that of the other motor. While it theoretically may be possible to control two such motors using two separate thyristor circuits having separate thyristor timing systems differentially varied by the steering angle, such an arrangement obviously would be very complex and expensive. One object of the present invention is to provide an improved thyristor control system which requires only a single main thyristor power circuit and a single thyristor timing or pulse generating system but which can efficiently control the speeds of a pair of traction motors even though the relative loads and speeds of the two motors vary widely as a function of steering angle.

While a truck having a pair of individually driven load wheel motors may use mechanical braking, the use of mechanical brakes for all decelerating is disadvantageous in that it results in brake lining wear. Also, mechanical braking ordinarily requires operator foot pressure on a brake pedal, while acceleration is controlled by a separate hand or foot control, and it is desirable that an operator be able to control both acceleration and deceleration with a single control. Furthermore, it is desirable in the interests of safety, to provide a second form of braking even if mechanical braking is provided. The use of dynamic braking is undesirable because large current-dissipating resistors must be provided, and because the amount of deceleration which may be obtained with simple and reliable circuitry is limited. Thus the limitations of mechanical braking and dynamic braking make it desirable that plugging be used to brake the truck, and it is another object of the invention to provide an improved thyristor-controlled DC series motor system which provides effective plugging. Because the loads carried by a truck may vary widely, as well as truck speed varying widely, it is highly desirable that the amount of plugging torque be readily controllable by the operator over a wide range, and another object of the invention is to provide an improved thyristor motor control system incorporating proportional plugging.

During acceleration each motor counter-emf opposes the battery-voltage pulses applied to the motors by the thyristor power circuit, thereby limiting motor current, but during plugging, when the motor field current is reversed relative to the armature, the armature voltage acts in the same direction as the applied battery voltage pulses, so that large motor currents tend to result. It is necessary or desirable to limit the amount of current which flows during plugging not only to avoid extreme torques or motor damage, but also in order to limit the current which flows in the main thyristor, since the maximum thyristor current determines the amount of charge required for thyristor commutation, and provision of adequate commutation charge is an important factor governing the expense of a thyristor control system. Because motor torque, speed and current relationships which pertain during travel differ markedly from those which pertain during plugging, it is apparent that a thyristor motor control system cannot modulate motor current identically during both of those two operational modes. While it is perhaps apparent that one could provide two separate proportional control systems, with one used for acceleration and the other used for plugging, the expense of such a duplicate system would be undesirably great. Thus it is another object of the invention to provide a single thyristor (SCR) control system which avoids such duplication.

Efficient use of battery power is also important in battery-powered lift truck applications, making it desirable that plugging consume a minimum practical amount of battery power. Appreciable battery power may be conserved with a preferred form of plugging using a plugging rectifier, wherein the armature voltage generated by motor deceleration causes circulation of a large current through the rectifier and motor armature, significantly decreasing power drain from the battery. In addition to conserving battery power when plugging, the decreased current which flows through the main thyristor when a plugging rectifier is used also decreases the amount of charge required to commutate the main thyristor, significantly decreasing the amount of commutating capacity which must be provided and thereby significantly decreasing the cost of the system. Use of the plugging rectifer also advantageously causes plugging torque to vary somewhat less drastically with motor speed. Thus another object of the invention is to provide an improved motor control system incorporating proportional plugging of a motor wherein armature current is circulated through a rectifier.

The provision of proportional plugging becomes formidable in a system wherein two separate traction motors are driven by a single thyristor power circuit, since driving the two motors from the same thyristor power circuit manifestly requires that the two motors be connected either in series or in parallel. Considerations of adequate starting torque dictate that series-field DC motors be used, but during plugging each such motor acts as a series-field generator aiding the battery voltage. Because the generated voltage versus field current characteristic of a series-field generator has a distinctly upward slope over much of its lower range, the connection of two series motors in parallel has been found to result in an unstable condition when the motors are plugged. An increase in the current in one motor causes it to draw increasing current and provide increasing voltage, while a decrease in the current in the other motor causes it to draw decreasing current and provide decreasing voltage, with a result that one motor rapidly becomes a generator driving the other motor, so that extreme motor currents and torques may suddenly occur, with one motor torque suddenly reversing, causing the wheel to lock and possibly causing the truck to overturn. Such instability has been avoided in some prior art systems where two Series motors were plugged by connection of the two series motors in series, but such systems disadvantageously require several additional contactors, and become complex and expensive if the two motors must be operated in plural modes, with one motor sometimes unpowered. Additional contactors would not be needed if the motors were operated in series during both acceleration and plugging, but use of motors in series during acceleration has various disadvantages, including a total loss of traction if either drive wheel slips. Another object of the invention is to provide a system for safely plugging two series motors which requires a minimum number of power contactors over and above those required for normal acceleration in both directions. In order to avoid the mentioned instability, an additional connection is made between the two motors to connect the two motor fields in parallel while plugging occurs, as will be seen below. Thus a principal object of the invention is to provide a dual motor systen wherein two series-field motors may be driven in parallel from a common thyristor power circuit and safely plugged.

While providing such an additional connection between the motors, so that their fields are connected in parallel and their armatures are also connected in parallel serves to obviate the mentioned instability, and causes no problem if the two motors run at the same speed, the two motors of the present truck must operate at widely varying speeds, with one motor even stopped or even turning in an opposite direction from the other motor, depending upon the operator-selected steering angle. At a turning angle where one motor speed is constrained by the steering angle to be very small relative to the other motor speed, the slower motor would tend to draw and waste far more current than the faster motor. In accordance with the present invention a normally-closed contactor is used to interconnect the two motors, with the contactor energized whenever the truck is being accelerated or coasting, but de-energized to interconnect the motors when the truck is being plugged. With the contactor energized, the voltages across the two motor fields may differ, and the voltages across the two armatures may differ, even though both motors are connected in parallel and driven from the same thyristor power circuit, and hence the motors may travel at widely differing speeds without one tending to short the other.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed descripton taken in connection with the accompanying drawings, in which:

Figures 1, 1A, 1B, 1C, 3:
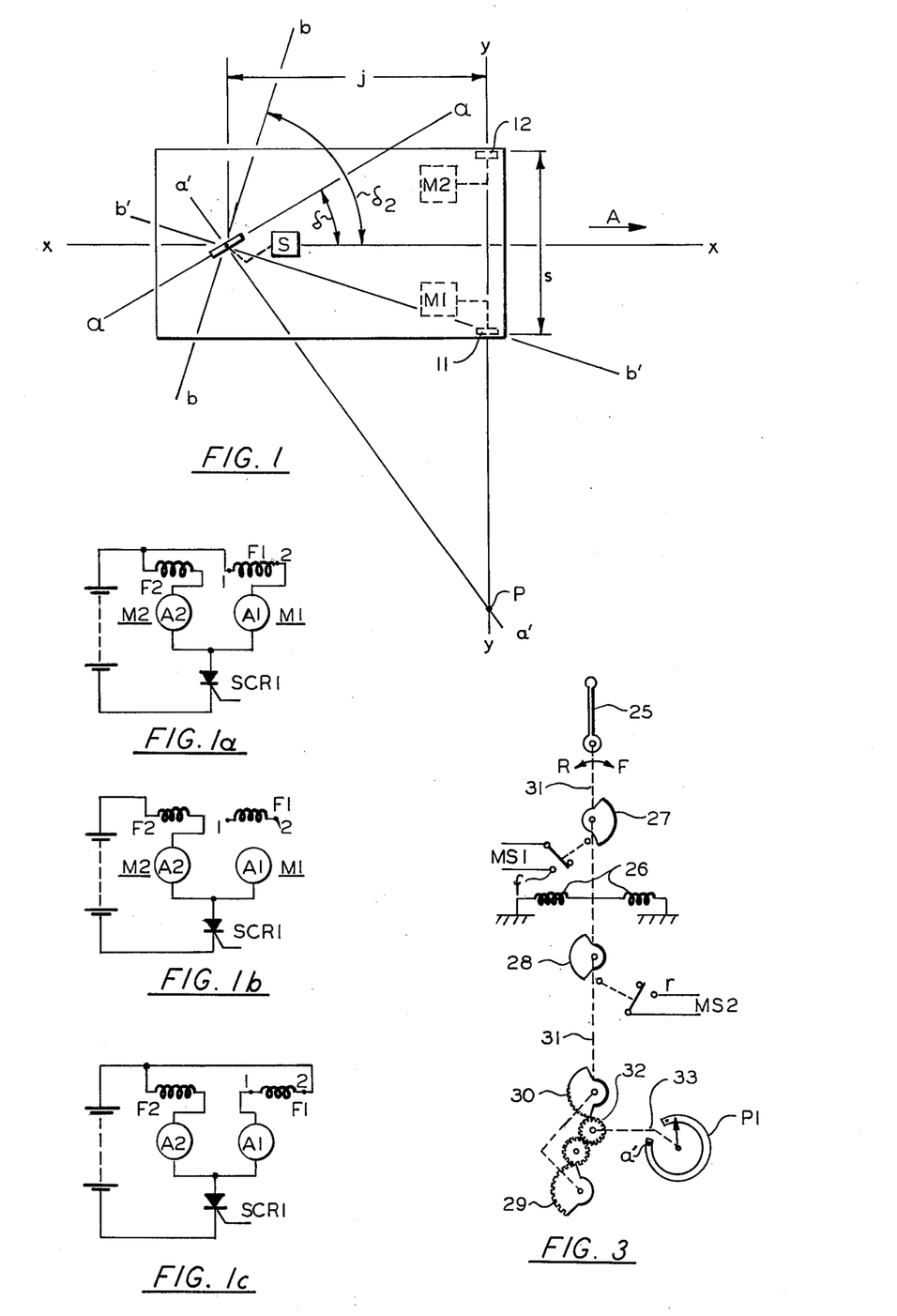
FIG. 1 is a plan view diagram of a truck equipped with dual drive motors.
FIGS. 1a, 1b and 1c are simplified circuit diagrams illustrating three different modes in which two drive motors of an exemplary form of the invention are operated.
FIG. 3 is a schematic diagram illustrating one form of manual controller which may be used with the present invention.

Referring now to the plan view diagram of FIG. 1, a truck base 10 is shown supported by drive wheels 11 and 12 mounted at one end of the truck distance $s$ apart, and by an unpowered steering wheel 13 mounted distance $j$ to the rear of wheels 11, 12. Steering wheel 13 is shown located on the truck centerline $x$—$x$, but that is not a necessity. Drive wheel 11 is mechanically connected to be driven by a series DC drive motor M1, drive wheel 12 is mechanically connected to be driven by series DC drive motor M2, each such connection being made through speed reduction gearing (not shown), and unpowered steering wheel 13 is mechanically connected to be turned about a vertical axis by a conventional power-assist steering system S to steer the truck. The instantaneous point P about which the truck turns in the absence of wheel slip is the intersection of a line $y$—$y$ which passes through drive wheels 11, 12 and a line $a'$—$a'$ perpendicular to the plane $a$—$a$ of steering wheel 13. If steering wheel deflection from a centered position is denominated $\delta$, the radius of the path of wheel 11 about poiint P can be shown to be $j \tan(90 - \delta) - (s/2)$, and the radius of the path of wheel 12 can be shown to be $j \tan(90 - \delta) + (s/2)$, so that the ratio between the speeds of the two drive wheels is $$\frac{n_2}{n_1} = \frac{j \tan(90 - \delta) + \frac{s}{2}}{j \tan(90 - \delta) - \frac{s}{2}}$$

and the instantaneous radius of the turn is $j/\cos(90 - \delta)$.

Assume the two drive motors are connected in parallel in the configuration shown in simplified form in FIG. 1a. If steering wheel 13 is pointed in the direction of axis $x$—$x$ in FIG. 1, i.e. if $\delta = 0$, and if motors M1 and M2 are connected in parallel to propel the truck forwardly, in the direction of arrow A, the two motors will see equal loads, travel at the same speed, and being similar motors, will draw substantially equal currents and provide substantially equal torques. If steering wheel 13 is turned to the angle $\delta$ shown in FIG. 1, so that turning will occur about point P, it will be apparent that motor M2 must turn faster than motor M1, and ideally would have more torque than motor M1. Since inboard motor M1 drives wheel 11, which acts a lesser lever arm distance from point P than wheel 12 driven by outboard motor M2, motor M1 will be presented with a larger percentage of the load and constrained to slow down, while motor M2 will see a lesser percentage of the load and speed up relative to motor M1. However, as motor M1 slows down its decreased counter-emf causes it to draw a larger percentage of the battery current and produce increased torque, rather than the decreased torque desired, and as motor M2 speeds up its increased counter-emf causes it to draw a smaller percentage of the battery current and to produce less torque, rather than the increased torque desired. If the turning angle is increased too much with the motors connected in the configuration of FIG. 1a, motor M1 may draw a large current that is largely wasted. If steering wheel 13 were pointed at angle $\delta_2$ along line $b—b$ perpendicular to line $b'—b'$ between wheels 11 and 13, it will be seen that, in the absence of wheel slip, the speed of motor M1 would be zero, with the truck pivoting about wheel 11 and with motor M1 stalled and drawing a large current. The angle $\delta_2$ equals 90-arc tan $(s/2j)$. In order to avoid such operation in trucks built in accordance with the present invention, steering with both motors accelerated in the same direction, i.e. in the configuration of FIG. 1a, is limited to angles less than $\delta_2$ in either direction from center. Whenever the steering angle exceeds a value $\delta_1$ (which is less than $\delta_2$) in either direction, the then slower or inboard motor is electrically disconnected and the truck is driven solely by the other motor, in the configuration shown in FIG. 1b for a right turn.

If the steering angle is gradually increased substantially beyond angle $\delta_1$ as the truck is driven by one active motor, the load seen by the active motor will increase, causing it to draw increasing current. The unpowered motor will be seen to be driven forwardly when the steering angle is less than $\delta_2$, to be stopped when the steering angle equals $\delta_2$, and to be driven in reverse when the steering angle exceeds $\delta_2$. When the steering angle exceeds $\delta_2$, the point P about which the truck is turning will lie between the front wheels 11, 12 of the truck, and a large torque may be required for motor M2 to drive the truck. If the steering angle commanded by the operator exceeds a value of $\delta_3$ at which maximum acceptable current is required for motor M2 to drive the truck, motor M1 is re-connected to drive in the reverse direction, to provide the configuration shown in FIG. 1c. With motors M1 and M2 driving their respective drive wheels in opposite directions, it will be seen that the turning point P will be located between the two front wheels, midway between those wheels if the steering wheel points parallel to axis $y—y$, in which case the two motors will rotate at equal speeds in opposite directions, drawing substantially equal currents and providing substantially equal torques. If the steering angle $\delta$ is slightly less than 90°, turning point P will lie slightly nearer motor M1, which will turn slightly slower than M2 and draw slightly more current. If the steering angle exceeds 90 degrees, the speed of motor M1 will become greater than that of M2, and if the steering angle were increased to a value of 90+ arc tan $(s/2j)$, the speed of motor M2 would become zero. However, the steering angle is limited to less than such an angle in either direction.

It may be pointed out that, if desired, the invention lends itself to a system wherein the steering angle may be unlimited. If desired, the motors may be appropriately re-connected as steering angle changes to provide dual motor drive in the same direction when the turning point P lies substantially outside either drive wheel, single motor drive when the turning point lies slightly inside or outside one drive wheel, and to provide dual motor drive in opposite direction when the turning point lies within a range of positions between the drive wheels.

While the above discussion only concerned turning to the right, it will be apparent that converse operation is provided for turns to the left, with the speed of motor M1 exceeding that of M2, M2 eventually being electrically disconnected and then re-connected for reverse travel as the steering angle is increased. As will be seen below, reconnection of the drive motors among the configurations shown in FIGS. 1a–1c may be done very simply by means of cam-operated limit switches or the like mechanically operated by the truck steering mechanism. A control system of this nature may be readily used on a variety of different trucks having different wheel spacing distances and/or motor current ratings by merely adjusting the steering angle positions at which the limit switches are operated, while any system using differential control of two thyristor power circuits to drive two motors at differing speeds tends to require substantial revision for different truck wheel spacings and motor current ratings.

Figure 2:
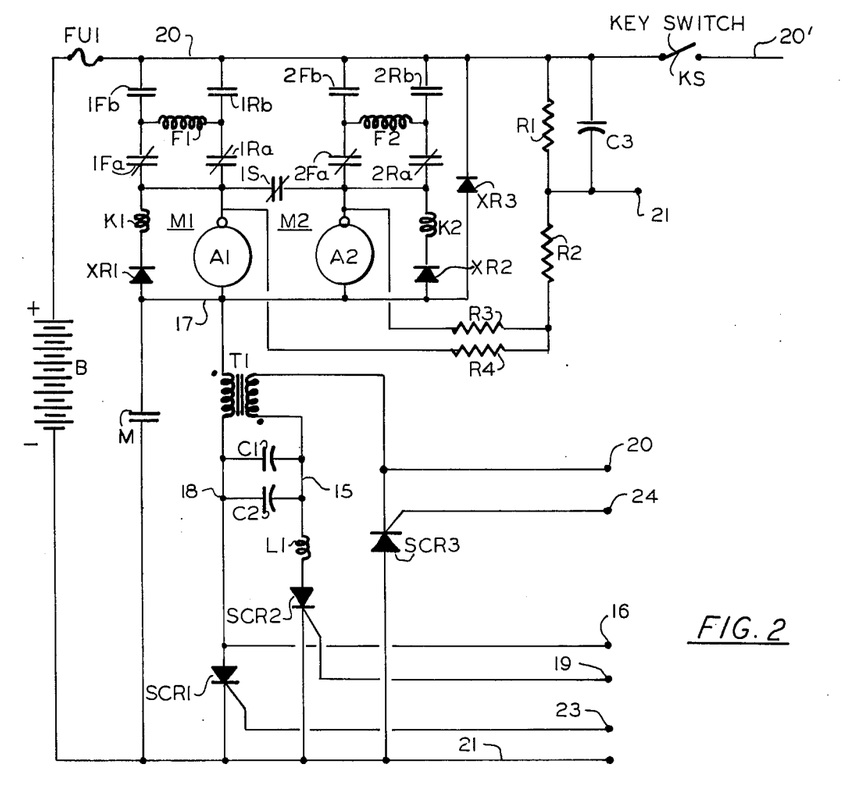
FIG. 2 is an electrical schematic diagram of the main motor circuit of one form of dual motor control system constructed in accordance with the invention.
Figure 4:
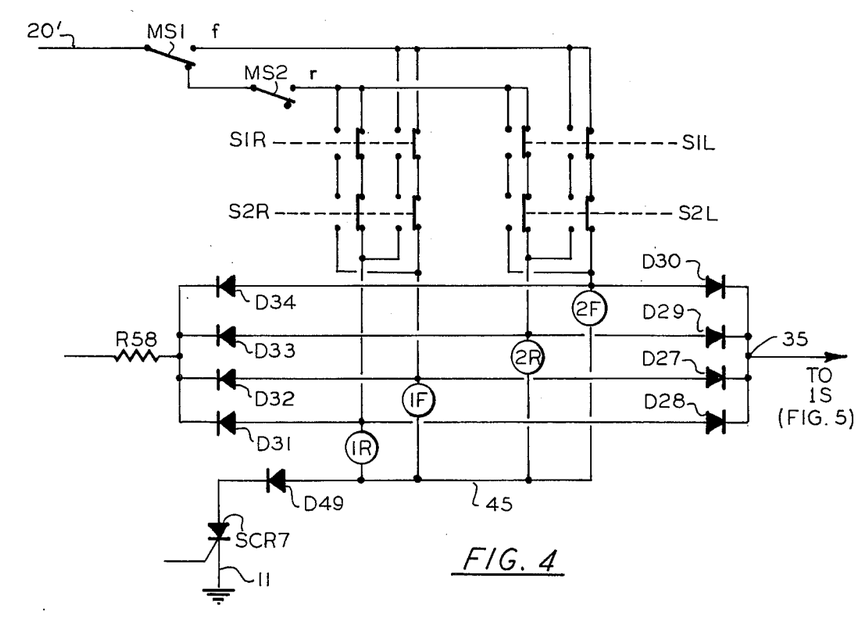
FIG. 4 is an electrical schematic diagram of an exemplary forward-reverse contactor control portion of the dual motor control system.

Turning now to the main motor power circuit shown in detail in FIG. 2, the negative terminal of battery B is connected to neutral or ground line 21, and the positive battery terminal is connected to positive bus 20 via fuse FU1. Motor direction is determined by switching the direction of field current, by selective energization of one or two of the forward and reverse or directional contactors 1F, 1R, 2F and 2R, the operating coils of which are shown in FIG. 4. Energization of contactor 1F closes its contact 1Fb and opens its contact 1Fa, so that current may flow from bus 20 via contact 1Fb, rightwardly through field F1 of motor M1 as viewed in FIG. 2, through NC contact 1Ra of reverse contactor 1R to armature A1 of motor M1, while energization instead of contactor 1R will be seen to allow current flow leftwardly through field winding F1. The direction of current through field winding F2 of motor M2 will be seen to be controlled in similar fashion by selective operation of either its forward contactor 2F or its reverse contactor 2R. It will be apparent that either the forward or the reverse contactor associated with a given motor must be operated in order to drive the motor.

Normally closed contacts of a shorting contactor 1S are shown connected to the upper terminals of each motor armature. The coil of contactor 1S is energized to open that contact pair with a brief delay as the control handle is moved to accelerate the truck, and then throughout acceleration operation contactor 1S remains energized, as will be explained below in greater detail. Assuming the forward contactors 1F and 2F are energized to provide forward acceleration, current will flow from the battery through the motor fields and armatures as soon as main thyristor SCR1 is turned on by application of a positive turn-on pulse to its gate lead via line 23. A positive turn-on pulse is simultaneously applied via line 24 to turn on SCR3. The increase in current through the primary winding of transformer T1 then provides a voltage spike from its secondary which charges commutating capacitors C1 and C2. The transformer secondary winding current will be seen to charge the capacitors through a series circuit which includes main SCR1 and SCR3, providing a positive voltage at the terminal 15 side of the capacitors, and when the capacitors reach a given charge, the current through SCR3 falls below the maintaining current of SCR3, so that SCR3 is automatically turned off.

A timed interval after the occurrence of the turn-off pulse, and typically a few milliseconds thereafter, a turn-off pulse is applied via line 19 to turn on commutating thyristor SCR2. Conduction of SCR2 will be seen to connect the commutating capacitors C1 and C2 across main SCR1 (in series with inductance L1), with the negative side of the capacitors connected to the anode of SCR1 and the positive side (terminal 15) connected to the cathode of SCR1 (via L1 and SCR2), so that the capacitors discharge and turn off main SCR1. As the capacitors discharge, the current through SCR2 decreases below the SCR2 maintaining current level, so that SCR2 is turned off. As main SCR1 turns off to interrupt motor current, the inductances of the motors tend to oppose a decrease in motor current, and the energy inductively stored in the motors circulates through "free-wheeling" rectifier XR3 to provide continued motor torque for a time after main SCR1 is turned off. Then the occurrences of a further turn-on pulse, followed by a further turn-off pulse, provides a further pulse of current to the motors, and the cycle is repeated. The time average current through the motors will be seen to depend upon the frequency or repetition rate of the turn-on pulses, and upon the interval after each turn-on pulse before the following turn-off pulse occurs. The manner in which the main thyristor SCR1 is shown arranged to be commutated is exemplary only, and not itself essential to the present invention, as a variety of alternative thyristor commutation techniques may be substituted.

The ratio between the speeds of the two motors is determined by the steering wheel direction, as explained in connection with FIG. 1, and when a turn is being made so that motor M2 is traveling faster than motor M1, for example, the greater counter-emf of motor M2 will cause it to draw less current than motor M1. During acceleration operation each armature voltage opposes the applied battery voltage, with the upper terminal (in FIG. 2) of each armature positive relative to its lower terminal, so that rectifiers XR1 and XR2 are reverse biased and relay coils K1 and K2 are not energized. The main motor circuit in FIG. 2 is shown as also including the contacts of a bypass contactor M. For high speed operation, after the operator moves his control handle a limit distance, the M contactor will be energized, connecting both motors directly across the battery, so that voltage is supplied continuously to the motors, by-passing the main thyristor SCR1 power circuit, so that sustained high speed operation can be attained without overheating main thyristor SCR1 and that thyristor may have a lesser current rating.

In order to control the speed of the truck in either direction, the operator is provided with a single manual (or pedal) control 25 of the nature shown schematically in FIG. 3. Control handle 25 is spring-biased to a centered position by spring means 26. Cams 27,28 and gear sectors 29,30 are carried on a shaft 31 rotated by movement of handle 25. Movement of handle 25 a slight distance in the forward direction from the centered position causes cam 27 to close contact $f$, and to maintain it closed as the handle is moved further forwardly, and gear sector 29 then simultaneously engages pinion 32 on shaft 33 of speed control potentiometer P1, thereby moving the wiper arm of the potentiometer toward its end terminal $a'$. Conversely, movement of handle 25 a slight distance in the reverse direction from the centered position causes cam 28 to close contact $r$, and to maintain it closed as the handle is moved further rearwardly, and gear sector 30 rotates shaft 33 via pinion 32, thereby moving the P1 wiper arm toward its end terminal $a'$. Thus the potentiometer P1 wiper is moved in the same direction for opposite movements of the control handle from center, which allows a single, simple three-terminal, speed control potentiometer P1 to be used to control both directions of truck travel, obviating any need for a special potentiometer having a second resistance element gap.

The basic arrangement for control of the directional contactors is illustrated in FIG. 4. When the operator moves the control handle 25 to close contact $f$, for forward acceleration, positive voltage normally will be applied from positive bus 20' to energize the coils of forward contactors 1F and 2F, assuming several other conditions are met. Firstly, it will be seen that none of the directional contactors can be energized unless thyristor SCR7 is turned on. The manner in which SCR7 is controlled to provide directional contactor operation with a predetermined time delay will be described below. Secondly, which directional contactors can be operated depends upon the conditions of four DPDT switches S1R, S1L, S2R, S2L, all of which are operated by the truck steering mechanism. These four switches are shown in the positions which they have when the steering angle $\delta$ is either zero or within a first range in either direction from zero, so that the two drive motors may be operated in parallel in the same direction, in the configuration of FIG. 1a. Switch S1R is arranged to be transferred from the condition shown whenever the selected steering angle exceeds a given amount to the right, while switch S1L is arranged to be transferred whenever the steering angle exceeds the same amount to the left. Thus both forward contactors 1F and 2F may be energized to connect both motors to drive the truck forward if the steering angle does not exceed a given amount. If an increasing turn to the right is being made, switch S1R will eventually open, dropping out contactor 1F so that right-side motor M1 will no longer propel the truck, but merely be driven as left-side motor M1 continues to propel the truck. Conversely, a left turn exceeding the predetermined angle will operate switch S1L to drop out contactor 2F so that left-side motor M2 will be unpowered and driven rather than driving. Thus a steering angle exceeding a given amount operates to disable the motor located on the inboard or lesser-radius side of the turning path.

If the steering angle exceeds an even greater angle, either steering switch S2R or S2L will be operated. The effect of operating either of those switches is to cause its associated motor to be driven in an opposite direction from the direction it would be driven with a zero or small steering angle. For example, the operation of switch S2L when an extreme turn to the left is being made causes contactor 2R to be energized through the now-transferred contacts of both switches S1L and S2L, thereby connecting left-side motor M2 to run in the reverse direction in parallel with motor M1 running in the forward direction. If the two motors are driven in opposite directions, it will be seen that an extremely sharp turn may be made, in effect pivoting the truck about a point between its drive wheels.

The steering angles at which switching to different ones of the three modes of FIGS. 1a to 1c is caused to occur is in some respects a matter of choice, depending not only upon the current ratings of the motor, but also upon the amount of tire scrubbing that is deemed acceptable. In several successful embodiments of the invention wherein distance $j$ of FIG. 1 was approximately 40 to 50 inches, distance $s$ was about 33 inches, and steering wheel 13 was displaced about 3 inches from the centerline $x-x$ (above the centerline in FIG. 1), one motor was arranged to be disconnected when the steering angle exceeded about 57° and to be reconnected for reverse operation when the steering angle exceeded about 75°, while the other motor was arranged to be disconnected when the steering angle exceeded about 63° in the opposite direction, and to be reconnected for reverse operation when the steering angle exceeded about 82°.

If the master switch is operated in either direction from center, it will be seen in FIG. 4 that positive voltage will be applied through either one or two of diodes D31 to D34 and through resistor R58. The voltage applied through resistor R58 energizes the contactor timing circuit, as will be explained below. Movement of the control handle to energize any of the forward-reverse contactors also applies voltage through one or two of diodes D27 to D30, to terminal 35, to energize a control circuit for shorting contactor 1S (FIG. 2). As will be seen below, the contacts of shorting contactor 1S will be opened very shortly after any directional contactors are energized to provide acceleration, but will remain closed whenever closure of directional contactors establishes a plugging condition. Due to the serious damage or injury which could result from circuit instability if plugging were to occur with contacts 15 open, it is important that contactor 1S be a normally closed type to achieve fail-safe operation.

Figure 5:
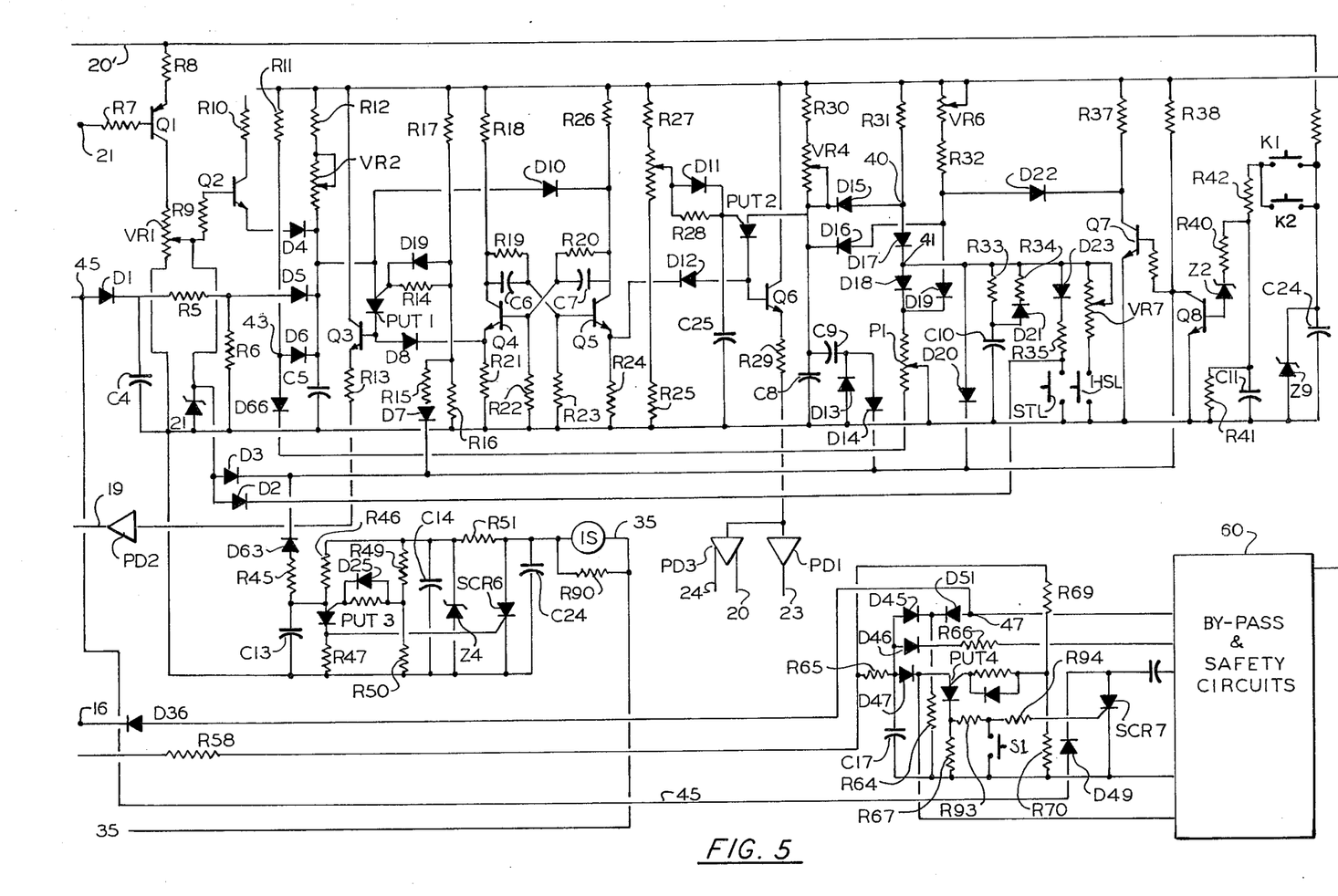
FIG. 5 is an electrical schematic diagram of a portion of an exemplary dual motor control circuit.

The basic pulse generation circuitry which generates the turn-on and turn-off pulses to control motor speed is shown in FIG. 5. The manner in which the circuit operates during normal acceleration will be explained first. Transistors Q4 and Q5 and their associated components comprise a conventional bi-stable flip-flop. Assume initially that Q5 is on and Q4 is off, i.e. that the flip-flop is cleared, or reset. Several currents to be mentioned will be applied to charge capacitor C8, eventually raising the anode of programmable unijunction transistor PUT2 to a level at which PUT2 will fire, that level being determined by the gate voltage applied to PUT2 through resistor R28 from the voltage divider consisting of resistor R27, a "high speed adjust" trimming potentiometer VR3, and resistor R25. When unijunction PUT2 fires capacitor C8 is discharged through PUT2, diode D12 and resistor R24, and then capacitor C8 immediately begins to recharge in the same manner as before. The positive pulse occurring at the PUT2 cathode each time it fires turns on amplifier transistor Q6, providing a positive pulse to power drive amplifiers PD1 and PD3. Amplifier PD1 applies a positive output pulse on line 23, to turn on SCR1 (FIG. 2) and thereby supply current to the motors, and push-pull amplifier PD3 simultaneously turns on SCR3 (FIG. 2) via lines 20 and 24. The positive pulse applied via diode D12 also raises the emitter of transistor Q5, turning off Q5, which causes transistor Q4 of the flip-flop to turn on, so that the flip-flop now is set. Unijunction transistor PUT2 and capacitor C8 will be seen to comprise a free-running relaxation oscillator circuit having a frequency or repetition rate governed by the magnitudes of the currents applied to charge capacitor C8, with an increase in such currents increasing the repetition rate.

A second or "width" relaxation oscillator which includes PUT1 and capacitor C5 is arranged not to be free-running but to be started at the instant of each turn-on pulse, and to provide a turn-off pulse and reset the Q4–Q5 flip-flop, after a controlled length of time. Thus current is applied to the motors while the width oscillator or pulser is charging.

As previously mentioned, the time required to charge capacitor C8 to the firing level of PUT2, and hence the period of the PUT2 - C8 frequency oscillator, is determined by the magnitudes of the several currents applied to capacitor C8. A fixed current is applied to capacitor C8 via resistor R30 and 'creep adjust" rheostat VR4. Resistor R31, diodes D17, D18, and the upper portion of the operator's speed control potentiometer P1 form a voltage divider which applies current to capacitor C8 via diode D15, and moving the P1 wiper arm downwardly will be seen to apply greater current to capacitor C8 via diode D15, thereby increasing the frequency oscillator repetition rate. It may be noted that a current will be supplied to C8 continuously through resistor R30 and rheostat VR4 all the while C8 is charging up, but that the current supplied to C8 through diode D15 will cease when the voltage across C8 exceeds the voltage at terminal 40. More precisely, current flow through D15 will cease when the voltage across capacitor C8 becomes more positive than a value which is approximately 0.7 volt (the forward voltage drop of diode D15) less than the voltage on terminal 40. Thus capacitor C8 is initially charged at a first selected rate by currents from both diode D15 and rheostat VR4 until D15 becomes back-biased, and then C8 is charged at a predetermined lesser rate by current from VR4 until the time at which PUT2 fires. During normal acceleration, the anode of diode D16 is grounded through D22 and then on transistor Q7, so that no current flows to capacitor C8 through diode D16. Also, transistor Q8 is off during acceleration, so that diode D14 is reverse-biased and no current flows through diode D14 to charge capacitor C9.

Capacitor C10, resistors R33, R34 and diode D21 will be seen to comprise a lag circuit connected in parallel with the upper portion of speed control potentiometer P1. The function of the lag circuit is to limit the maximum attainable rate of increase of the repetition rate of the frequency oscillator, and hence maximum vehicle acceleration, to a safe value, even if the operator moves potentiometer P1 very rapidly. Diode D21 and resistor R34 will be seen to provide a shorter lag time-constant for a decrease in voltage at terminal 41 than for an increase, and thus the vehicle may be decelerated substantially more quickly than it may be accelerated, which is highly desirable, of course, for sake of safety.

The contacts of switch HSL are shown connected in series with rheostat VR7 between terminal 41 and ground. A plurality of further NO switches (not shown) may be similarly connected to terminal. The switches may be arranged to be closed upon the occurrence of a variety of different conditions during which vehicle speed should be limited. For example, one such switch may be arranged to be closed whenever the truck load carriage is elevated above a given level, and another such switch arranged to be closed whenever a reach mechanism has been extended beyond a predetermined point. One such switch may comprise a centrifugal switch driven by a traction motor to close when vehicle speed reaches a predetermined limit, or if the drive wheel slips so that the motor reaches a high speed. The closure of any such switch will be seen to divert current which otherwise would charge capacitor C8, thereby decreasing the frequency oscillator repetition rate. Rheostat VR7 may be adjusted so that closure of one of the switches does not cause a sudden decrease in motor current, but instead prevents an appreciable further increase in motor current. In similar fashion, the contacts of switch STL are linked to be operated by the vehicle steering mechanism, to be closed whenever the steering angle exceeds a selected amount in either direction, to limit motor torque by diverting current from capacitor C8.

As mentioned above, the provision of a turn-on pulse switches the flip-flop to turn on Q4 and turn off Q5. Prior to that time, with Q5 on, capacitor C5 of the width oscillator or pulser will have been clamped to the low voltage on the Q6 collector by diode D10, preventing capacitor C5 from charging. As soon as the turn-on pulse sets the flip-flop, diode D10 becomes back-biased by the high Q5 collector voltage, and capacitor C5 is allowed to charge up until it triggers programmable unijunction transistor PUT1. From the time of the turn-on pulse until PUT1 fires, main SCR1 (FIG. 2) applies battery voltage to motors M1 and M2. The firing of PUT1 discharges capacitor C5 through PUT1, diode D8 and resistor R21, it provides an amplified turn-off pulse to the commutating SCR2 via transistor Q3, power driver amplifier PD2 and line 19, and it raises the Q4 emitter to cut off Q4, thereby returning the flip-flop to its original clear or reset state.

During normal acceleration, and when the flip-flop is set so that C5 is not clamped by diode D10, currents are applied to charge capacitor C5 via "width adjust" potentiometer VR2, via diode D6, and during certain conditions to be described, via diodes D4 and D5. A predetermined current is continuously applied to C5 via resistor R12 and rheostat VR2. Resistor R11, diode D66 and the lower portion of speed control potentiometer P1 forms a voltage divider which supplies current to C5 via diode D6 until C5 is charged to the level of terminal 43, at which time D6 becomes back-biased and C5 is thereafter charged at a lesser rate. As the wiper arm of speed control potentiometer P1 is moved downwardly to increase the repetition rate of the frequency oscillator, the voltage at terminal 43 is decreased, thereby decreasing the current applied to C5 via diode D6, and thereby increasing the time interval between the turn-on and turn-off pulses. Thus downward movement (as shown in the schematic diagram) of the wiper arm of speed control potentiometer P1 serves to increase time during which battery voltage is applied to the drive motors, both by increasing the repetition rate of the pulses and by lengthening the duration of the pulses.

If the wiper arm of width adjust rheostat VR2 is moved downwardly in FIG. 5 increased charging current from VR2 to capacitor C5 will decrease the period of the width oscillator. Since it also will hasten the time during each charging cycle at which diode D6 becomes back-biased, it will also decrease the effect which adjustment of speed control potentiometer P1 has on the period of the width oscillator. Thus adjustment of rheostat VR2 determines the amount by which operator adjustment of speed control potentiometer P1 affects the width of the current pulses applied to the motors.

A further current is applied via diode D4 to charge capacitor C5 and provide a turn-off pulse very quickly if either or both motor currents exceed a desired value. As may be seen in FIG. 2, the currents through the two motors will provide voltage drops across their respective field windings F1 and F2. The voltage drops across the two field windings are coupled via resistors R3 and R4 to a low-pass filter circuit comprising resistors R1,R2 and capacitor C3. Thus the voltage at terminal 21 (relative to the positive battery potential on line 21) will be seen to be proportional to the sum of the currents through the two motors. As shown in FIG. 5, that voltage is applied via resistor R7 to the base of transistor Q1, which is biased by resistors R7,R8 so as normally to be barely conducting. If the sum of the motor currents begins to exceed a predetermined value, so that the voltage at terminal 21 decreases sufficiently below the positive supply level, transistor Q1 is turned on more, supplying current via potentiometer VR1 to turn on transistor Q2, thereby supplying current to capacitor C5 via diode D4 to limit the width of current pulses applied to the motors. By provision of substantial gain in transistors Q1 and Q2, "flat" limiting at a desired current value is achieved. The level at which Q2 turns on to limit motor current is adjusted by adjustment of potentiometer VR1, and accurately fixed at the selected limit level by using zener diode Z1 to control the bias on transistor Q2. The low-pass filter (R1,R2,C3) in FIG. 2 is provided with a substantial time-constant, of the order of 0.2 second, to allow momentary current surges.

The arrangement shown, wherein motor current is sensed by measuring the voltage drop across the motor field has several important advantages over techniques generally used in the prior art, such as measuring the voltage drop across the main SCR. Firstly, such prior systems usually must be recalibrated when different SCRs are substituted because of the substantial variation in the on resistance between different SCRs. Secondly, the present system advantageously acts in response to motor temperature, since the field winding resistance increases as the motor temperature rises, thereby limiting average motor current to a lesser amount if either motor becomes abnormally warm.

During normal acceleration, terminal 45 lies substantially at zero voltage, and hence no current is applied to capacitor C5 via diode D5. However, as the operator moves his control handle 25 in either direction through the centered position, so as to cause a change from acceleration to plugging, for example, positive battery voltage (switched as shown in FIGS. 4 and 5) is applied to terminal 45 to charge capacitor C4. The positive voltage is applied to line 45 until the directional contactors are energized to establish the plugging mode. While the positive voltage is applied to line 45, and for a brief time interval thereafter while capacitor C4 discharges through resistors R5 and R6, current is applied to charge capacitor C5 via diode D5, thereby insuring that the first several plugging pulses applied to the motors cannot exceed a predetermined width, and hence insuring that extreme motor currents and extreme deceleration cannot result.

During normal acceleration, whether in the forward or reverse direction, whenever main SCR1 is turned on each motor armature provides a counter-emf voltage such that its upper terminal (in FIG. 2) is positive relative to its lower terminal. If the operator moves the control handle to re-connect the field windings for reverse travel while the truck is travelling forward, or if he moves the control handle to reconnect the field windings for forward travel while the truck is travelling in reverse, the plugging mode is effected. Reversing the field windings to effect plugging causes a reversal of the counter-emf voltage which appears across each armature when main SCR1 is turned on. A respective diode rectifier (XR1, XR2) and plugging relay coil (K1,K2) in series are connected across each armature, so that the two plugging relay coils are energized whenever the operator causes plugging to occur. Plugging relay coils K1,K2 comprise heavy copper bars having only one of a few turns, and plugging rectifiers XR1, XR2 are capable of carrying large currents. Since each plugging relay coil has very little resistance and its associated plugging rectifier has very little forward resistance, large currents circulate through each armature and its associated plugging recifier while the main SCR1 is turned on when plugging occurs at any substantial speed. The circulating currents may considerably exceed the motor field currents. The use of the plugging rectifier will also be seen to limit the voltages across the armatures to very small values approximating the forward drops of the plugging rectiviers, thereby decreasing the current in each field from the value it would reach in the absence of a plugging rectifier.

With the shorting contacts in FIG. 2 closed whenever plugging occurs, it may be seen that the two motor armatures are connected in parallel, as well as the two series fields being connected in parallel. At small turning angles when the two motors are both active in the same direction or at very large turning angles so that the two motors are active in opposite directions, it will be seen that the relative amounts of current which circulate through the two armatures and the plugging rectifiers, which are now also in parallel with each, will vary in accordance with the relative speeds of the two motors, but that the parallel connection of both armatures and fields will tend to make the plugging torques of the two motors equal. At a medium steering angle, however, when one motor field is disconnected to render that motor inactive, it will be seen that the armature of that inactive motor will be connected in parallel with the active armature and both plugging rectifiers when plugging occurs. However, because the inactive armature has considerably more resistance than the plugging rectifiers, its parallel connection with the active armature and the plugging rectifiers causes no appreciable effect, and only a small current flows through the inactive armature compared to that flowing through the active armature and the plugging rectifiers.

The energization of either or both plugging relay coils whenever plugging occurs closes one or both pairs of contacts (K1,K2) shown near the upper right side of FIG. 5. The closure of either or both contacts will be seen to apply forward bias to turn on transistor Q8. The conduction of Q8 during plugging accomplishes a number of functions. Turning on Q8 grounds terminal 41 through diode D20, thereby disabling the C10 acceleration limiter circuit, so that plugging may be varied as rapidly as desired, irrespective of the steering angle, the load carriage elevation, and the extension of the reach mechanism. The conduction of Q8 also grounds the Q2 base via diode D3, thereby disabling the Q1–Q2 current limit circuit and allowing the increased currents which are necessary to accomplish effective plugging. The grounding of terminal 41 also cuts off diode D18, so that the upper portion of speed control potentiometer P1 is no longer excited by current from resistor R31. Turning on Q8 also effectively grounds terminal 40 through diodes D17 and D20 so that no current will be applied via diode D15 to charge capacitor C8. Conduction of Q8 also turns off transistor Q7, so that diode D22 will no longer clamp the D19 anode to ground through Q7, and hence current now will be applied via diode D16 to charge capacitor C8 from the voltage divider comprising "plug adjust" potentiometer VR6, resistor R32 and the upper portion of the winding of speed control potentiometer P1. Thus operator proportional adjustment of P1, the same speed control which was used during the acceleration mode, will continue to proportionally control the repetition rate of the pulses applied to the motors, even though a much different range of repetition rates is provided for the plugging mode.

Conduction of transitror Q8 also grounds capacitor C9 through diode D14, thereby connecting C9 in parallel with C8, substantially changing the frequency oscillator charging time-constant, and markedly lowering the range of repetition rates available from the frequency oscillator. The parallel combination of capacitors C8 and C9 will be seen to be charged during each cycle at an initial rate by currents from both rheostat VR4 and diode D16, and then at a lesser rate when the charge across the capacitors cuts off diode D16. Conduction of Q8 also grounds resistor R15 via diode D7, lowering the voltage applied to the PUT1 control electrode, and thereby decreasing the width of the pulses applied to the motors during plugging. The PUT1 control electrode potential level is preferably lowered sufficiently by the grounding of resistor R15 that capacitor C5 will be charged rapidly by the current from rheostat VR2, irrespective of the current through diode D6 governed by the adjustment of the speed control potentiometer P1 and hence adjustment of the speed control potentiometer P1 then will have very little effect upon the width of the current pulses applied to the motors during plugging. Thus while motor current is controlled during acceleration by varying both pulse width and pulse frequency, during plugging the pulses applied to the motors are substantially of constant width, and within a frequency range markedly lower than that usable during acceleration.

At low repetition rates during plugging, it is sometimes possible for a complete collapse of a field flux to occur in between successive current pulses applied to a motor, and possible for such a flux collapse to induce a reversal of armature current, thereby tending to de-energize and drop out the plugging relay (K1 or K2) until the next current pulse is applied to the motor. To prevent Q8 from switching the pulse generation circuitry back and forth between acceleration and plugging conditions if a plugging relay does momentarily drop out or chatter, a low-pass filter (C11,R41) is connected to delay the turn-off of Q8 when the plugging relay contacts open. The provision of zener diode Z2 in series with the gate lead of Q8 insures that transistor Q8 will be switched on and off abruptly at a predetermined value.

When the operator moves the control handle from center to energize any of the directional contactors shown in FIG. 4, they are energized only after a brief time delay, of the order of 0.1 second, before SCR7 is turned on. Closure of master switch contact $f$ (FIG. 4), such as for forward acceleration with both motors, applies voltage through diodes D32 and D34, and resistors R58 and R65 (FIG. 5) to charge capacitor C17. Diode D45 will then be backbiased by the positive voltage applied to D45 from terminal 47 through diode D51. When the voltage across C17 reaches a level determined by the R69, R70 voltage divider, unijunction PUT4 fires and capacitor C17 discharges through diode D47, PUT4 and resistor R67. The rise of the PUT4 cathode is coupled to the SCR7 gate via resistors R93 and R94, thereby causing turn-on of SCR7, energization of the forward directional contactors 1F and 2F, and energization of the motors. Terminal 47 is connected via diode 36 and line 16 to the anode of the main SCR1 (FIG. 2). The periodic firing of the main SCR1 then periodically grounds terminal 47 through diode D36, thereby lowering the voltage applied via diode D51 to diode D45 to a value below the firing potential of PUT4. Thus diode D45 then will prevent capacitor C17 from charging up to fire PUT4 again, during normal operating conditions. Later, whenever the operator opens the master switch contact $f$ to interrupt the current through the directional contactors and resistor R58, SCR7 will be turned off, and any voltage on capacitor C17 will discharge through diode D45 and resistor R64. The C17-SCR7 directional contactor control circuit is shown connected by a plurality of lines to by-pass contactor control and safety circuits which are indicated at block 60 in FIG. 5. The circuits of block 60 control the high speed by-pass or M contactor, the contacts of which are shown in FIG. 2, and operate to prevent energiaztion of or to disable the directional contactor under a variety of operating conditions, such as if main thyristor SCR1 becomes shorted or open. The circuits of block 60 preferably comprise those shown in copending Application Ser. No. 430,917 filed Dec. 26, 1973 by Michael J. Delaney and John W. Ames and assigned to the same assignee as the present invention.

Whenever any directional contactor is enabled to be energized for normal acceleration, voltage is applied through one or two of diodes D27 to D30 (FIG. 4) to the coil of shorting contactor 1S (FIG. 5) and resistor R90 in parallel therewith. In the absence of plugging, transistor Q8 is off so that diode D63 will be reverse-biased, and hence current may flow from the coil 1S and resistor R90 through resistors R51 and R46 to charge capacitor C13. Only a small current insufficient to operate contactor 1S initially flows through its coil and resistor R51, but C13 eventually charges up enough to fire PUT3 and turn on SCR6, thereby connecting full battery voltage across the coil of contactor 1S and opening its NC contacts shown in FIG. 2. The provision of resistor R90 in parallel with coil 1S insures that SCR6 will receive adequate maintaining current to remain conducting once it has fired, even if substantial inductance in coil 1S limits the rise of current through the coil for a comparatively long time compared to the brief triggering pulse applied to SCR6 by PUT3. The time delay with which PUT3 and SCR6 are turned on is selected to be slightly greater than the time delay of the C17, PUT4, SCR7 contactor timing circuit, for reasons which will become apparent below. The firing of SCR6 grounds R51 so that C13 cannot charge again to repeatedly fire PUT3. With contactor 1S operated, it will be seen that neither the armature voltages nor the field voltages of the two motors are constrained to be equal, and hence the two motors may travel at the widely varying relative speeds which turning may require without a large current circulating between the motors.

Assuming the truck is traveling forwardly with a zero or modest steering angle so that both motors are driving the truck and the operator then moves the control handle through center to the reverse direction to effect plugging, the opening of master switch contact $f$ as the master switch reaches center will drop out forward contactors 1F and 2F, and interrupt the current theretofore applied to the contactor 1S coil via diodes D27 and D30, thereby turning off SCR6 and dropping out contactor 1S. As the master switch is moved past center and its $r$ contact closes, voltage is applied via diodes D28 and D29 (FIG. 4) to coil 1S (FIG. 5), and via diodes D31 and D33 (FIG. 4) and resistor R58 (FIG. 5) to the C17-SCR7 contactor timing circuit. In approximately 0.1 second SCR7 will fire to energize reverse contactors 1R and 2R. Then the armature voltages will have the proper polarity to operate plugging relays K1 and K2, causing transistor Q8 (FIG. 5) to turn on. Turn on of transistor Q8 grounds capacitor C13 through resistor R45 and diode D63, thereby preventing any firing of PUT3 and SCR6 to energize contactor 1S, and hence while plugging occurs the two motor fields are connected in parallel and the two motor armatures are connected in parallel. It will be seen that the delay of the shorting contactor timing circuit must be at least slightly greater than the delay of the directional contactor timing circuit so that the latter can operate to cause operation of the plugging relays and turn on of Q8 before C13 charges to a level sufficient to fire PUT3 and SCR6. As the plugging torque decelerates the truck, the motor currents gradually decrease and eventually the armature currents decrease to values sufficiently small that the plugging relay contacts open, turning off Q8, thereby re-establishing acceleration mode frequency and pulse width control, and allowing shorting contactor 1S to open, whereupon the truck will then proceed to accelerate in normal fashion in the reverse direction.

While various of the features disclosed, such as the arrangement shown for varying the generation of thyristor turn-on and turn-off pulses, have been illustrated in connection with a dual motor system, it will be apparent that they are applicable as well to single motor systems. Further, it will become apparent that a variety of changes may be made in the switching circuitry disclosed, using straightforward techniques, without departing from the invention.

S1 is a normally open interlock switch on 1S which shorts one end of resistor R93 to ground when contactor 1S is energized or open.

The switch actuation prevents further triggering and turn on of SCR 7.

Consequently the energizing or re-energizing of the directional contactors in the presence of abnormal operation of the 1S circuit is prohibited.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. A battery-powered vehicle comprising a base mounted on a pair of non-steerable drive wheels and having a steering wheel; first and second series-field direct-current motors connected to drive respective ones of said drive wheels at mutually relative speeds dictated by the positioning of said steering wheel; first directional contactor means for connecting power from a first circuit terminal through the field of said first motor to a first terminal of the armature of said first motor, second directional contactor means for connecting said first circuit terminal through the field of said second motor to a first terminal of the armature of said second motor; thyristor means and a battery connected in series between a second terminal of each of said armatures and said first circuit terminal; pulse generator means for applying pulses to said thyristor means to turn said thyristor means on and off; timing circuit means for controlling said pulse generator means to vary the conduction duty cycle of said thyristor means; means for sensing whether said motors are being accelerated or plugged; a normally-closed contactor connected between said first terminals of said armatures; and means responsive to adjustment of an operator control and responsive to said sensing means for energizing said normally-closed contactor to open its contacts while said motors are being accelerated and for de-energizing said normally-closed contactor while either one or both of said motors are being plugged.

2. A vehicle according to claim 1 having switch means responsive to the positioning of said steering wheel for controlling the energization of said first and second directional contactor means, to connect the fields of said motors to run said motors in a first direction over a first range of steering angles, to connect said field of said first motor to run said first motor in said first direction and to disconnect the field of said second motor over a second range of steering angles, and to connect the field of said first motor to run said first motor in said first direction and to connect the field of said second motor to run said second motor in an opposite direction over a third range of steering angles.

3. A vehicle according to claim 1 wherein said means for sensing comprises a first relay coil and a first rectifier connected in series across the armature of said first motor, a second relay coil and a second rectifier connected in series across the armature of said second motor, and switch means operated by energization of either of said relay coils.

4. A vehicle according to claim 1 wherein said directional contactor means are controllable in accordance with adjustment of said operator control in one direction or the other from a centered position for controlling the polarity of the connection of each of said fields relative to its respective armature.

5. A vehicle according to claim 1 having a rectifier means connected between said second terminals of said armatures and said first terminal of said battery.

6. A vehicle according to claim 1 wherein said timing circuit means comprises a free-running relaxation oscillator circuit operative to provide turn-on pulses to turn on said thyristor means, said free-running oscillator circuit having an RC timing circuit adjustable by said operator control to vary the repetition rate of said free-running oscillator circuit, and a pulser circuit operative to provide turn-off pulses to turn off said thyristor means, said pulser circuit having an RC charging circuit enabled by each of said turn-on pulses and adjustable by said operator control to vary the time after each turn-on pulse that a turn-off pulse occurs.

7. A vehicle according to claim 1 wherein said means for energizing and de-energizing said normally-closed contactor comprises a time delay circuit enabled and disabled by said sensing means.

8. A vehicle according to claim 1 having electronic switching means responsive to adjustment of said operator control from a centered position for operating said first and second directional contactor means after a predetermined time delay.

9. A vehicle according to claim 1 having electronic switching means responsive to adjustment of said operator control from a centered position for operating said first and second directional contactor means after a first predetermined time delay, and wherein said means for energizing and de-energizing said normally-closed contactor comprises a time delay circuit enabled by operation of said switching means and operative to energize said normally-closed contactor after a second predetermined time delay unless said time delay circuit is disabled by said sensing means during said second predetermined time delay, said second predetermined time delay being greater than said first predetermined time delay.

10. A vehicle according to claim 1 wherein said means for sensing is operative to sense the polarity of the voltage across each of said armatures.

11. A vehicle acccrding to claim 1 having switching means responsive to said sensing means for varying the operation of said timing circuit means between accelerating and plugging conditions so that adjustment of said operator control may provide a first range of conduction duty cycles of said thyristor means during accelerating andd a second range of conduction duty cycles of said thyristor means during plugging.

12. A vehicle according to claim 1 having means for sensing the voltage across the fields of said motors; limiting means responsive to the voltage across said fields for limiting the conduction time of said thyristor means; and means responsive to said means for sensing whether said motors are being accelerated or plugged for disabling said limiting means when said motors are being plugged.

13. A vehicle according to claim 1 wherein said timing circuit means includes pulse width determining means for determining the length of each conduction time of said thyristor means, and said vehicle includes time delay switching means controllable in accordance with adjustment of said operator control in one direction or the other from a centered position for operating said directional contactor means after a time delay period to connect each of said fields to its respective armature with a polarity in accordance with the direction of said adjustment from said centered position, said time delay switching means being connected to apply a signal to said pulse width determining means during said time delay period to limit the conduction time of said thyristor means during the first several conduction duty cycles of said thyristor means following said time delay period.

14. A control system for a battery-powdered vehicle, comprising in combination: a series-field direct-current motor having a field and an armature; thyristor means; directional contactor means for connecting said motor and said thyristor means in a series circuit across a direct current source; an operator control; pulse generator means including a relaxation oscillator operable to provide turn-on pulses to said thyristor means at a repetition rate governed by the adjustment of said operator control and a single-shot timing circuit operable to provide a turn-off pulse to said thyristor means after a delay period of said single-shot timing circuit governed by adjustment of said operator control; first switching means responsive to adjustment of said operator control for controlling said directional contactor means to selectively control the polarity connection of said field relative to said armature to select an acceleration or a plugging condition; and sensing means responsive to the occurrence of a plugging condition for simultaneously reducing said repetition rate of said relaxation oscillator and said delay period of said single-shot timing circuit.

15. A system according to claim 14 having current limit means for sensing the circuit through said motor and reducing said delay period of said single-shot timing circuit when said current exceeds a predetermined value and wherein said sensing means is operative to disable and current limit means upon the occurrence of a plugging condition.

16. A system according to claim 14 wherein said first switching means is operable to de-energize said directional contactor means at a mid-position of said operator control to interrupt said series circuit, and said system includes capacitor means connected to be charged upon adjustment of said operator control to said mid-position and connected to said single-shot timing circuit to reduce said delay period as said capacitor means discharges after adjustment of said operator control from said mid-position.

17. A system according to claim 14 wherein said sensing means comprises means responsive to the polarity of the voltage across said armature.

18. A system according to claim 17 wherein said sensing means comprises a relay coil and a rectifier connected in series across said armature.

19. A system according to claim 14 wherein said relaxation oscillator comprises a capacitor circuit, a first resistance, and a second resistance, said sensing means being operable to selectively apply current to said capacitor circuit through said first resistance or said second resistance in accordance with the occurrence of an acceleration condition or a plugging condition, respectively.

20. A control system for a battery-powered vehicle, comprising, in combination: a series-field direct-current motor having a field and an armature; thyristor means; directional contactor means for connecting said motor and said thyristor means in a series circuit across a direct-current source; pulse generator means including a relaxation oxcillator timing circuit operable to apply turn-on pulses repetitively to said thyristor means to turn on said thyristor means and a single-shot timing circuit operable in response to each turn-on pulse to apply a turn-off pulse to said thyristor means after the delay period of said single-shot timing circuit; an operator control; switching means responsive to adjustment of said operator control for controlling said directional contactor means to selectively control the polarity connection of said field relative to said armature to select acceleration of plugging conditions; said timing circuit including variable resistance means and a first capacitor, said variable resistance means being operable in response to adjustment of said operator control to control the rate of charging of said first capacitor and thereby to control the frequency of said pulses; a second capacitor; and sensing means responsive to the occurrence of a plugging condition for connecting said second capacitor in parallel with said first capacitor to reduce the frequency of said pulses during said plugging condition.

21. A system according to claim 20 wherein said first capacitor is connected between first and second terminals, said second capacitor is connected in series with a diode and a transistor between said first and second terminals, and said sensing means comprises means responsive to the polarity of the voltage across said armature for turning on said transistor during said plugging condition.

22. A control system for a battery-powdered vehicle, comprising, in combination: a series-field direct-current motor having a field and an armature; thyristor means; directional contactor means for connecting said motor and said thyristor means in a series circuit across a direct-current source; an operator control; switching means responsive to adjustment of said operator control for controlling said directional contactor means to selectively control the polarity connection of said field relative to said armature to select acceleration or plugging conditions; pulse generator means including a relaxation oscillator timing circuit operable to apply turn-on pulses repetitively to said thyristor means; a thyristor commutating circuit operable in response to turn-off pulses to turn off said thyristor means; a second timing circuit operable to apply turn-off pulses to said commutating circuit; said relaxation oscillator timing circuit comprising first capacitor means, a first plurality of input circuits for selectively applying current to said first capacitor means, and first triggering means responsive to the voltage across said first capacitor means and operative to provide said turn-on pulses; said second timing circuit comprising second capacitor means, a second plurality of input circuits for selectively applying current to said second capacitor means, and second triggering means responsive to the voltage across said second capacitor means and operative to provide said turn-off pulses; and sensing means selectively responsive to the occurrence of acceleration and plugging conditions for selectively enabling and disabling said input circuits.

23. A system according to claim 22 wherein said first plurality of input circuits comprises a first input circuit including first resistance for applying a fixed current to said first capacitor means, and a second input circuit for applying current to said first capacitor means, said second input circuit comprising second and third resistance means, a variable resistor means connected to be adjusted by said operator control and switching means, and switching means being operably responsive to said sensing means during an acceleration condition to connect said second resistance means in series with said variable resistor means and to apply a first range of currents to said first capacitor means as said variable resistor means is adjusted by said operator control, and operably responsive to said sensing means during a plugging condition to connect said third resistance means in series with said variable resistor means and to apply a second range of currents to said first capacitor means as said variable resistor means is adjusted by said operator control.

24. A system according to claim 22 wherein said second plurality of input circuits comprises a first circuit including a first resistance for applying a fixed current to said second capacitor means, and a second input circuit including voltage divider means connected to be adjusted by adjustment of said operator control for applying a variable current to said second capacitor means, and switching means operably responsive to said sensing means upon occurrence of a plugging condition for decreasing the voltage level on said second capacitor means at which said second triggering means is operative to provide said turn-off pulses.

25. A system according to claim 22 wherein said second plurality of input circuits comprises third capacitor means, switching means connected to be operated by said operator control and operative to charge said third capacitor means as said control is moved through a mid-position between accelertion and plugging conditions, and circuit means connecting said third capacitor means to apply current to said second capacitor means.

26. A system according to claim 23 having switching means operably responsive to said sensing means for varying the capacity of said first capacitor means between acceleration and plugging conditions.

27. In a steerable vehicle having a pair of drive wheels required to rotate at mutually different speeds as said vehicle is steered, wherein each of said drive wheels is connected to be driven by a respective series-field motor, each of said motors is connected to receive power from a common pulse-modulated power circuit, and first control means are provided to select the polarity relationships between the fields of said motors and their respective armatures to switch said motors between acceleration and plugging conditions, the combination of a normally-closed contactor operable during said plugging conditions to connect the armatures of said motors in a parallel circuit connection and operable during said acceleration conditions to interrupt said parallel circuit connection, means responsive to operation of said first control means for energizing said normally-closed contactor, and means responsive to the occurrence of a plugging condition for disabling said means for energizing said contactor.

28. The combination according to claim 27 wherein said means for energizing said contactor is normally operative to energize said contactor after a first time delay period following operation of said first control means to select said polarity relationships, and said disabling means is operative to prevent energization of said contactor if said plugging condition occurs during said delay period.

29. The combination according to claim 27 wherein said disabling means comprises means for sensing the polarity of the voltages across said armatures.

30. The combination according to claim 27 wherein said diabling means comprises relay means and rectifier means connected in series with each other and in parallel with said armatures of said motors.

* * * * *